June 22, 1937.  E. L. POHL  2,084,704
DEVICE FOR WASHING COOKING UTENSILS, DISHES, AND THE LIKE
Filed Jan. 28, 1936  2 Sheets-Sheet 1
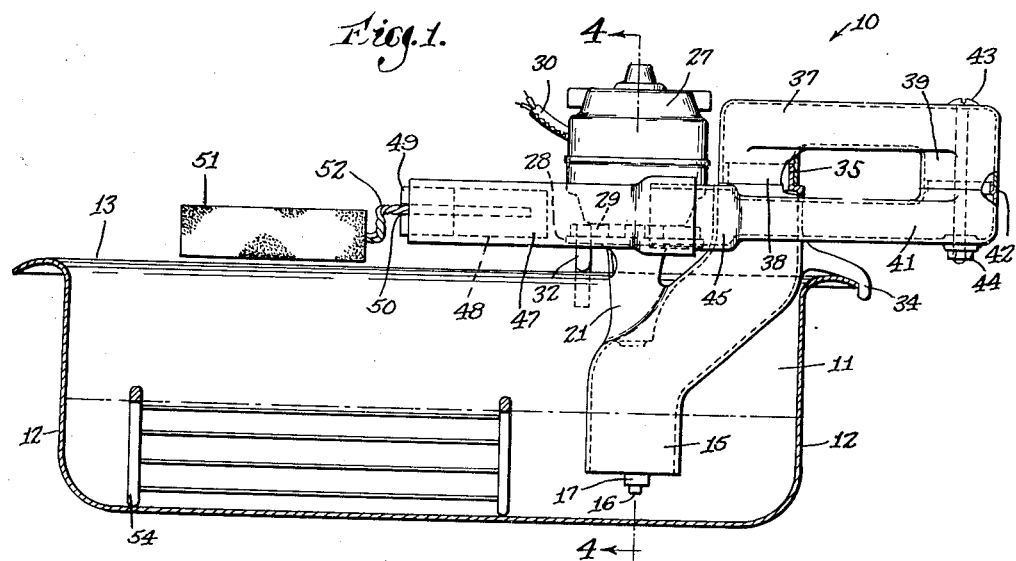
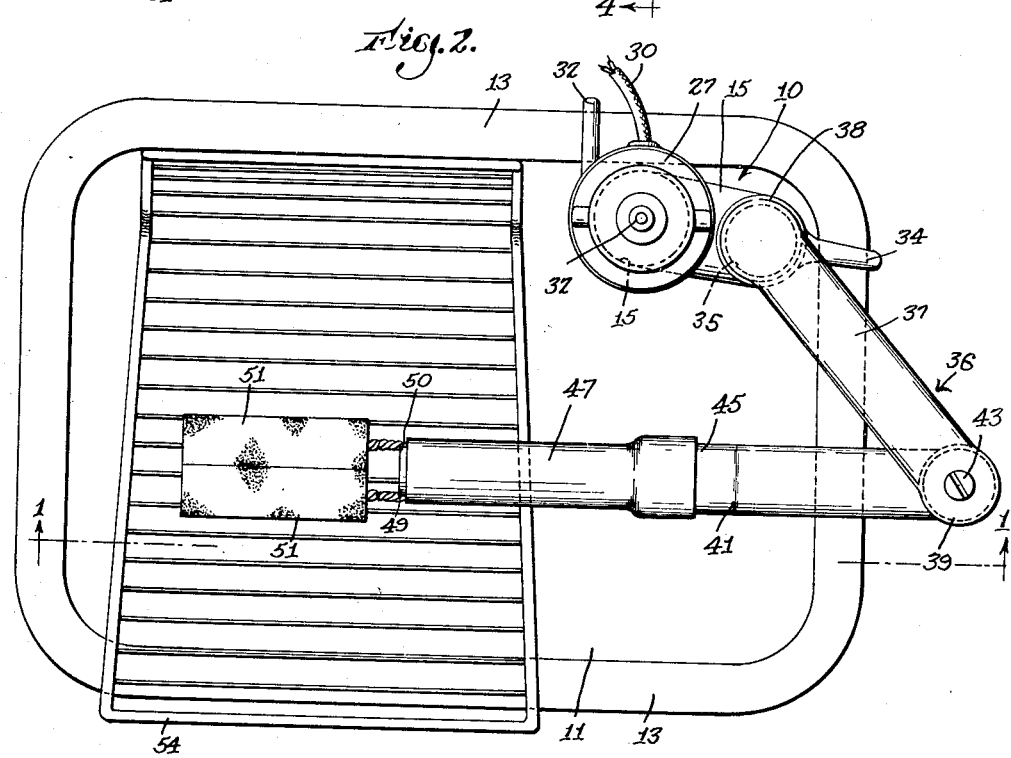
Inventor
Edwin L. Pohl
by Harold E. Cole
Attorney June 22, 1937.  E. L. POHL  2,084,704
DEVICE FOR WASHING COOKING UTENSILS, DISHES, AND THE LIKE
Filed Jan. 28, 1936  2 Sheets-Sheet 2

Inventor
Edwin L. Pohl
by Harold E. Cole
Attorney

Patented June 22, 1937

2,084,704

UNITED STATES PATENT OFFICE 2,084,704

DEVICE FOR WASHING COOKING UTENSILS, DISHES, AND THE LIKE

Edwin L. Pohl, Oshkosh, Wis.

Application January 28, 1936, Serial No. 61,125

5 Claims. (Cl. 15—74)

This invention relates to a device for washing cooking utensils, dishes, cups and the like.

One object of my invention is to provide a small device which can be used to wash the more difficult articles such as kettles, casseroles and cooking utensils as well as cups, plates and other eating dishes. Another object is to provide such a device that can be manipulated by hand in any direction, while automatically receiving a constant supply of water. Still another object is to provide means whereby my device may be supported by the container which holds the supply of water, whereby my device and the container become a portable unit.

A further object is to provide such a device in combination with a container to hold the washing fluid which can be made without the need of skilled workmen and assembled by unskilled labor, whereby its cost of production is so small that it is within the price range of the ordinary home.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 1 is a side elevation view of my device mounted on a water container, said container being shown in section on the line 1—1 of Figure 2.

Figure 2 is a plan view of my device mounted on a water container.

Figure 3:
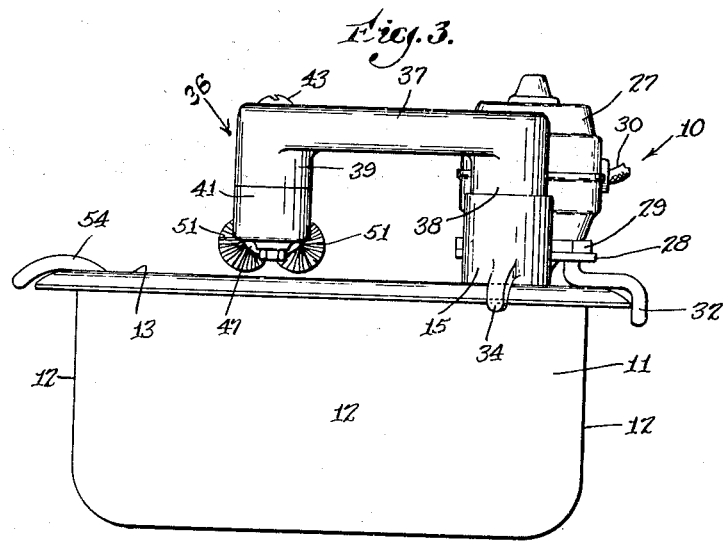
Figure 3 is an end elevation view of my device mounted on a water container.
Figure 4:
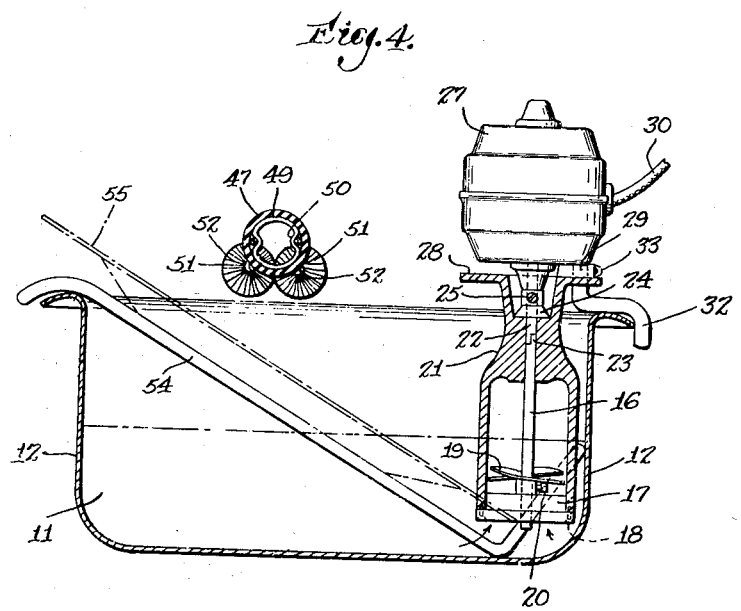
Figure 4 is a sectional view of my device taken on the line 4—4 of Figure 1.

As illustrated my device 10 extends into and is supported by a water container 11 which is preferably rectangular in shape, having upstanding sides 12 bounded by a top rim or edge 13. Said device consists of a pump having a cylinder or barrel 15 which extends into said container 11, and has a shaft 16 extending upwardly in said cylinder 15 and rotatably fitting into a cross bar bearing 17 mounted to said cylinder by screws 18. In the lower portion of said cylinder near the end thereof is an impeller or vane 19 fastened to said pump shaft 16 by a screw 20.

Extending from said pump cylinder 15 is a housing 21 for a motor shaft 22 which engages with said pump shaft 16 as shown at 23, the two interfitting so that they rotate as a single shaft.

A collar 24 to hold said motor shaft 22 in position is mounted by means of a screw 25 entering into said motor shaft. A motor 27 of well known construction rotates said shafts 22 and 16 to thereby pump water from said container 11 through my device. Said motor 27 rests on blocks 29 formed integral with a supporting plate 28 on the top of said housing 21. Current is supplied to said motor 27 through a cord or wire 30 which is adapted to be connected to a source of electrical supply not shown. A supporting member 32 for my device is mounted in a said block 29 and held by a screw 33, and extends from said block over the said edge 13 of said container 11 adjacent one corner thereof. Another supporting member 34 extends from said cylinder 15 over the said edge 13 of said container 11 adjacent the first-mentioned supporting member 32 but around the corner therefrom. Said supporting members 32 and 34 serve to hold my device in a predetermined position at one end of said container 11.

Said cylinder 15 terminates at its upper end in a reduced neck 35 to which my flexible washing conduit 36 is attached, consisting of tubular member 37, preferably made of metal or other durable material, having an elbow portion 38 at one end which rotatably fits over said neck 35, as best illustrated in Figure 1 of the drawings, whereby said washing conduit may be rotated, thus permitting rearward and forward movement of it as will presently be seen. Said tubular member 37 also has another elbow portion 39 at the other end which rotatably fits over the end of another tubular member 41, and rests on a seat 42 formed near the end of said tubular member 41 as best shown in Figure 1 of the drawings. This swivel connection between said elbow portion 39 and tubular member 41 permits sidewise movement to either the right or left of my washing conduit 36. A bolt 43 and nut 44 hold said elbow portion 39 and tubular member 41 movably together. The outside end 45 of said tubular member 41 extends into a flexible hose 47, preferably made of rubber, so that it may be freely moved, especially up and down, during the washing action. Within said hose 47 is a metal shield 48, and next to that is a metal sleeve 49 which serves as a holder for the brushes 51 which are mounted on wires 52 which fit into grooves 50 in said metal sleeve 49. It will thus be seen that my washing conduit 36 may be moved in any desired direction, backward or forward, to the right or left, and up or down, thereby permitting the freest movement possible of this cleansing means by the operator. The water passes through and out said conduit 36, wetting the brushes 51, and as the water and brushes come in contact with the soiled dishes it is of the utmost importance to be able to manipulate the conduit in every direction freely, as my device permits. Merely making the whole washing conduit of flexible material, such as a rubber tube, will not accomplish this, as in certain positions the tube will be so bent that the supply of water is shut off or greatly reduced.

In order to make it possible to clean plates 55 and the like without wetting the hands, I provide my container with a tray 54 which supports a plate in a partly upright position whereby it can readily be cleaned with my washing conduit.

Inasmuch as the brushes 51 are readily removable from the conduit 36 different types and sizes may be inserted in said conduit and used for cleaning various kinds of cooking utensils, dishes and other articles.

What I claim is:

1. In combination, a washing device and a container adapted to hold liquid, said device comprising pumping instrumentalities embodying a cylinder extending into said container diagonally downward and at an angle to and away from a side of said container, means mounted on said container to support said instrumentalities in operative position, and flexible conduit means rotatably communicating with said instrumentalities.

2. In combination, a washing device and a container adapted to hold liquid, said device comprising pumping instrumentalities embodying a cylinder extending into said container, a housing extending separately from and communicating with said cylinder, a shaft extending into said housing and cylinder, impeller means mounted on said shaft and movable in said cylinder, and means above said housing to actuate said shaft, means mounted on said container to hold said instrumentalities in operative position, and a flexible conduit movably communicating with said instrumentalities.

3. In combination, a washing device and a container adapted to hold liquid, said device comprising pumping instrumentalities embodying a cylinder a portion of which extends downwardly into said container in a diagonal direction and thence continues in a vertical direction, a housing extending separately from and communicating with said cylinder, a shaft extending into said housing and cylinder, impeller means mounted on said shaft and movable in said cylinder, and means to actuate said shaft, means mounted on said container to hold said instrumentalities in operative position, and a flexible conduit movably communicating with said instrumentalities.

4. In combination, a rectangular container adapted to hold liquid and a washing device mounted at one corner of said container, said device comprising pumping instrumentalities embodying an upright cylinder extending into said container, a tubular member rotatably mounted on the top of and communicating with said cylinder and extending sidewise therefrom and beyond said corner, another tubular member rotatably communicating with said first-mentioned tubular member, and another tubular member communicating with said second-mentioned tubular member and extending outwardly therefrom, said tubular members being higher than said container and directly communicating with each other.

5. In combination, a washing device and a container adapted to hold liquid, said device comprising pumping instrumentalities above and extending into said container, a tubular member communicating with and rotatably mounted on a vertical axis on said instrumentalities and extending sidewise therefrom, another tubular member rotatably communicating with said first-mentioned tubular member, and a flexible tubular member communicating with said second-mentioned tubular member, said tubular members being above said container and so positioned that they may be swung away from said connecting point beyond said container or swung directly over said container.

EDWIN L. POHL.